(No Model.)
A. STEINHEIL.
Photographic Camera Lens.
No. 241,438.                    Patented May 10, 1881.
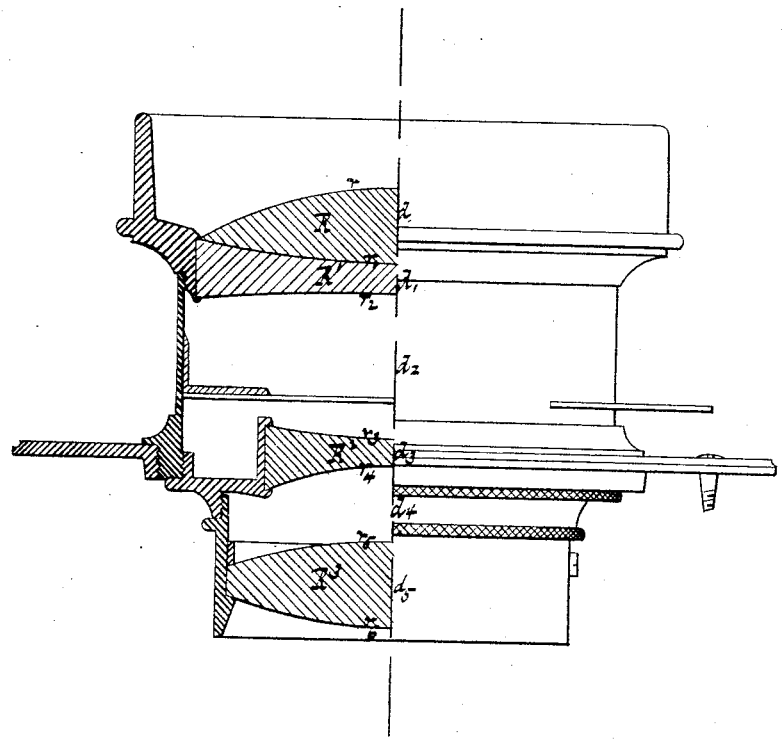
Witnesses
William Miller
Otto Ahfeland
Inventor
Adolph Steinheil.
by Van Santvoord & Hauff,
his attorneys

UNITED STATES PATENT OFFICE.

ADOLPH STEINHEIL, OF MUNICH, BAVARIA, GERMANY.

PHOTOGRAPHIC-CAMERA LENS.

SPECIFICATION forming part of Letters Patent No. 241,438, dated May 10, 1881.

Application filed March 2, 1881. (No model.)

*To all whom it may concern:*

Be it known that I, ADOLPH STEINHEIL, a subject of the King of Bavaria, residing at Munich, in the Kingdom of Bavaria and German Empire, have invented new and useful Improvements in Photographic-Camera Lenses, of which the following is a specification.

This invention consists in the combination, in a photographic camera-lens, of two pairs of lenses, the first pair being composed of a biconvex crown-glass lens cemented to a biconcave flint-glass lens having a strong chromatic and spherical aberration, a strongly-curved image, and a positive focus equal to about two-thirds of that required for the complete lens, while the second pair of lenses consists of a biconcave flint-glass lens and a biconvex crown-glass lens, the flint-glass lens being placed at a distance of about one-third of the aperture of the first pair of lenses from said first pair, and the crown-glass lens at a distance from the flint-glass lens equal to about one-fourth of its aperture, the focus of said second pair being negative and somewhat more than three times as large as that of the first pair, while the spherical and chromatic aberration and the curvature of the image is equal in strength but opposite to that of the first pair of lenses.

This invention is illustrated in the accompanying drawing, which represents a sectional side view of my lens.

It has always been considered exceedingly difficult to construct double lenses (or lenses composed of two pairs) which produce plane images, and the distinctness of these images diminishes from the center toward the circumference slower or quicker, according to the greater or less degree of perfection in the construction of the lenses. By long-continued calculations I have found that the images produced by double lenses are more distinct toward the circumference the more unequally the effect of the complete lens is distributed between its two component parts or pairs of lenses.

The aplanatic lens which forms the subject-matter of this present application for a patent is intended for indoor use in a photographer's room, where a large opening in proportion to the focus is the main condition, while it is permissible to separate the lenses of one of the pairs, and therefore it is named "anti-planet for portraits."

The example shown in the drawing has a focus of two hundred and forty millimeters and an aperture of seventy-six and twenty-five one-hundredths millimeters at the outer pair of lenses. The inner pair consists of two separate lenses of different diameters—that is to say, of a flint-glass of forty-six and four-tenths millimeters and a crown-glass lens of fifty-eight and eight-tenths millimeters aperture. The outer pair has a positive focus of one hundred and fifty-six millimeters, and it consists of a biconvex crown-glass lens, R, cemented to a biconcave flint-glass lens R'. It has a strong chromatic and spherical aberration and a strongly-curved image, in the same sense as a simple positive lens. The other pair of lenses, which is situated at a distance from the outer pair equal to about one-third of the opening of such outer pair, consists of a biconcave flint-glass lens, $R^2$, and a biconvex crown-glass lens, $R^3$, placed at a distance from each other equal to about one-fourth of their openings. This pair has a negative focus of seven hundred and seventy-seven millimeters, a strong spherical and chromatic aberration, and also a strongly-curved image, but in opposite direction to the outer pair, such aberration being similar to those of a simple negative lens. The complete lens therefore consists of a not-compensated positive lens and a hyper-compensated negative lens.

The species of glass used are as follows:

|  | Crown. | Flint. |
|---|---|---|
| Refraction for yellow rays | 1.51705 | 1.57710 |
| Refraction for violet rays | 1.53250 | 1.60229 |

For a lens of the dimension above stated I use the following elements:

In the formulas, $d$, $d_1$, $d_3$, and $d_5$ represent the length of the axis of the respective lenses, and $d_2$ $d_4$ represent the axial distance between the lenses, while $r$, $r_1$, $r_2$, &c., represent the radii of the curves to which they are respectively attached in the drawing.

$r = +\ 72.24$ millimeters.
$r_1 = \pm\ 240.81$ "  } Crown $d = 14.70$ millimeters.

$r_2 = -\ 535.14$ "  } Light flint $d_1 = 5.35$ millimeters.

Distance between the two pairs of lenses $d_2 = 26.7$ millimeters.

$r_3 = -\ 144.92$ millimeters.
$r_4 = -\ 60.96$ "  } Light flint $d_3 = 5.35$ millimeters.

Distance between these two separated lenses $d_4 = 13.9$ millimeters.

$r_5 = +\ 103.54$ millimeters.
$r_6 = +\ 96.52$ "  } Crown $d_5 = 16.1$ millimeters.

From this description it will be seen that the two pairs which constitute my lens contain very great but opposite faults, and at the same time have very unequal focuses, while the same, when combined, accomplish in a high degree all the conditions necessary for correct images.

I do not desire to limit myself to the precise species of glass named in the foregoing description, but reserve the right to substitute therefor other species of glass which will produce the same result.

What I claim as new, and desire to secure by Letters Patent, is—

The combination, in a photographic-camera lens, of two pairs of lenses, the first pair being composed of a biconvex crown-glass lens cemented to a biconcave flint-glass lens having a strong chromatic and spherical aberration, a strongly-curved image, and a positive focus equal to about two-thirds of that required for the complete lens, while the second pair of lenses consists of a biconcave flint-glass lens and a biconvex crown-glass lens, the flint-glass lens being placed at a distance of about one-third of the aperture of the first pair of lenses from said first pair, and the crown-glass lens at a distance from the flint-glass lens equal to about one-fourth of its opening, the focus of said second pair being negative and somewhat more than three times as large as that of the first pair, while the spherical and chromatic aberration and the curvature of the image are equal in strength but opposite to those of the first pair, substantially as described.

In testimony whereof I have hereunto set my hand and seal in the presence of two subscribing witnesses.

ADOLPH STEINHEIL. [L. S.]

Witnesses:
  OTTO WERNHARD,
  EMIL HENZEL.